(12) United States Patent
Peck, Jr. et al.

(10) Patent No.: US 10,483,880 B2
(45) Date of Patent: Nov. 19, 2019

(54) MULTIPLE ELECTROMECHANICAL ACTUATOR CONTROL SYSTEM

(71) Applicant: The Boeing Company, Chicago, IL (US)

(72) Inventors: James L. Peck, Jr., Huntington Beach, CA (US); Jimmy M. Quiambao, Huntington Beach, CA (US); Jeffrey Charles Coffman, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/289,409

(22) Filed: Oct. 10, 2016

(65) Prior Publication Data
US 2018/0102718 A1    Apr. 12, 2018

(51) Int. Cl.
| H02K 11/24 | (2016.01) |
|---|---|
| H02P 5/00 | (2016.01) |
| B64C 13/50 | (2006.01) |
| H02P 5/74 | (2006.01) |
| H02P 5/747 | (2006.01) |
| H02P 6/04 | (2016.01) |
| H02P 29/024 | (2016.01) |
| H02P 101/30 | (2015.01) |

(52) U.S. Cl.
CPC .............. *H02P 5/00* (2013.01); *B64C 13/50* (2013.01); *H02P 5/74* (2013.01); *H02P 5/747* (2013.01); *H02P 6/04* (2013.01); *H02P 29/0241* (2016.02); *H02P 2101/30* (2015.01)

(58) Field of Classification Search
CPC .............. H02P 5/00; H02K 11/24; H02K 3/31
See application file for complete search history.

(56) References Cited

U.S. PATENT DOCUMENTS

| 4,329,636 A | 5/1982 | Uchida et al. | |
|---|---|---|---|
| 2002/0149331 A1* | 10/2002 | Marcinkiewicz | B23K 20/121 318/254.1 |
| 2006/0043242 A1* | 3/2006 | Benson | B64C 13/503 244/175 |
| 2012/0018578 A1* | 1/2012 | Polcuch | B64C 13/50 244/99.2 |

(Continued)

FOREIGN PATENT DOCUMENTS

EP    2527248 A2    11/2012

OTHER PUBLICATIONS

European Patent Office; Office Action for European Patent Application No. 17195620.4 dated Feb. 7, 2018, 9 Pages.

*Primary Examiner* — Muhammad S Islam
(74) *Attorney, Agent, or Firm* — Sage Patent Group (57) ABSTRACT

A system for controlling multiple actuators that are attached to a structure for moving and positioning the structure include a magnetic flux sensor in a motor of each actuator. The magnetic flux sensor senses a magnetic flux in an associated motor and generates an electrical signal that corresponds to the magnetic flux in the associated motor. The system also includes a control unit that receives the electrical signal from the magnetic flux sensor of each actuator. The control unit is configured to generate a drive command signal to each actuator that balances a torque applied to the structure by each actuator in response to the magnetic flux sensed in the motor of each actuator.

21 Claims, 6 Drawing Sheets

(56) References Cited

U.S. PATENT DOCUMENTS

| | | |
|---|---|---|
| 2012/0303210 A1* | 11/2012 | Matsui .................. B64C 13/503 701/36 |
| 2013/0033215 A1 | 2/2013 | Krishnamurthy et al. |
| 2014/0163783 A1 | 6/2014 | Pierre et al. |
| 2015/0021441 A1 | 1/2015 | Matsui |
| 2016/0340026 A1 | 11/2016 | Antunes et al. |
| 2016/0340030 A1 | 11/2016 | Roussey et al. |

* cited by examiner

MULTIPLE ELECTROMECHANICAL ACTUATOR CONTROL SYSTEM

FIELD

The present disclosure relates to electromechanical actuators, and more particularly to a multiple electromechanical actuator control system.

BACKGROUND

Vehicles and other equipment or structures may include structural components that are moved or positioned by actuators, such as electromechanical actuators. For example, an aircraft or aerospace vehicle includes flight control surfaces that are moved and positioned by actuators or electromechanical actuators. Multiple actuators may be used to move and position a single flight control surface. An actuator may include more than one electrical motor or a number of separate actuators may be attached to the same surface. These actuators or motors within the actuators may act on the flight control surface with different forces or torques. Accordingly, the actuators may be resisting or fighting one another in moving or positioning the surface rather working in concert or together. An actuator that in not operating within limits or design parameters or has failed may be hindering or resisting the operation of the other actuators moving the surface.

SUMMARY

In accordance with an embodiment, a system for controlling multiple actuators that are attached to a structure for moving and positioning the structure includes a magnetic flux sensor in a motor of each actuator. The magnetic flux sensor senses a magnetic flux in an associated motor and generates an electrical signal that corresponds to the magnetic flux in the associated motor. The system also includes a control unit that receives the electrical signal from the magnetic flux sensor of each actuator. The control unit is configured to generate a drive command signal to each actuator that balances a torque applied to the structure by each actuator in response to the magnetic flux sensed in the motor of each actuator.

In accordance with another embodiment, a system for controlling multiple actuators that are attached to a structure for moving and positioning the structure includes a magnetic flux sensor in a motor of each actuator. The magnetic flux sensor senses a magnetic flux in an associated motor and generates an electrical signal that corresponds to the magnetic flux in the associated motor. The system also includes a control unit that receives the electrical signal from the magnetic flux sensor of each actuator. The control unit includes a threshold window detector configured to perform a function including detecting a magnetic flux density of a particular actuator being outside preset performance limits based on the electrical signal corresponding to the magnetic flux in the associated motor of the particular actuator. The control unit also includes a flux selector configured to perform a function including deactivating the particular actuator in response to the magnetic flux density of the particular actuator being greater than an upper preset limit or lower than a lower preset limit.

In accordance with another embodiment or any of the previous embodiments, the flux selector is further configured to perform a function including neutralizing a difference between the magnetic flux density of the motor of each actuator.

In accordance with another embodiment or any of the previous embodiments, neutralizing the difference between the magnetic flux density of the motor of each actuator includes equalizing the magnetic flux density of the motor of each actuator by modifying a gain of an actuator driver circuit associated with each actuator.

In accordance with another embodiment, a method for controlling multiple actuators that are attached to a structure for moving and positioning the structure includes sensing a magnetic flux in a motor of each actuator and generating an electrical signal that corresponds to the magnetic flux in the motor. The method also includes generating a drive command signal to each actuator that balances a torque applied to the structure by each actuator in response to the magnetic flux sensed in the motor of each actuator.

In accordance with another embodiment or any of the previous embodiments, the motor of each actuator includes a three-phase electric motor and the magnetic flux sensor includes a flux sensor winding for each phase of the three-phase electric motor.

In accordance with another embodiment or any of the previous embodiments, the three-phase electric motor includes an annular stator. The annular stator includes a plurality of stator posts for each phase. The stator posts for each phase are individually interspersed consecutively about the annular stator. The annular stator also includes a phase winding for each phase. The phase winding for each phase is wound around the plurality of stator posts associated with each respective phase.

In accordance with another embodiment or any of the previous embodiments, the flux sensor winding for each phase includes a secondary winding wound around at least one stator post of an associated phase. An electrical current flowing in the phase winding of a particular phase generates a magnetic flux in each stator post of the particular phase and the magnetic flux produces a magnetic field at each stator post. The magnetic field generates a voltage signal across the flux sensor winding for the particular phase. The voltage signal has an amplitude corresponding to a level of the magnetic flux in the stator post around which the flux sensor winding for the particular phase is wound.

In accordance with another embodiment or any of the previous embodiments, the flux sensor winding for each phase is electrically connected to a magnetic flux level detector for each phase. Each magnetic flux level detector is configured to convert an alternating current (AC) voltage signal from an associated flux sensor winding to a direct current (DC) voltage signal that corresponds to a magnetic flux level in an associated phase of the motor.

In accordance with another embodiment or any of the previous embodiments, the system further includes a circuit configured to determine a magnetic flux density for the motor from the DC voltage signals from the three phases of the motor. The magnetic flux density for the motor corresponds to a torque provided by the motor when the motor is energized and the circuit generates an output signal that represents the torque provided by the motor or actuator to the structure.

In accordance with another embodiment or any of the previous embodiments, the DC voltage signals from the three phases of the motor are summed to provide the magnetic flux density for the motor and the output signal that represents the torque provided by the motor or the associated actuator to the structure.

In accordance with another embodiment or any of the previous embodiments, the system further includes a compare and balance module that receives a plurality of output signals from the circuits configured to determine the magnetic flux density of the motor associated with each actuator. Each output signal represents the torque provided by the motor of each actuator to the structure. The compare and balance module is configured to compare each output signal and to generate a command signal to each actuator that balances the torque applied by each actuator to the structure.

In accordance with another embodiment or any of the previous embodiments, the structure is a flight control surface of an aircraft.

The features, functions, and advantages that have been discussed can be achieved independently in various embodiments or may be combined in yet other embodiments further details of which can be seen with reference to the following description and drawings.

DETAILED DESCRIPTION

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

Figure 1:
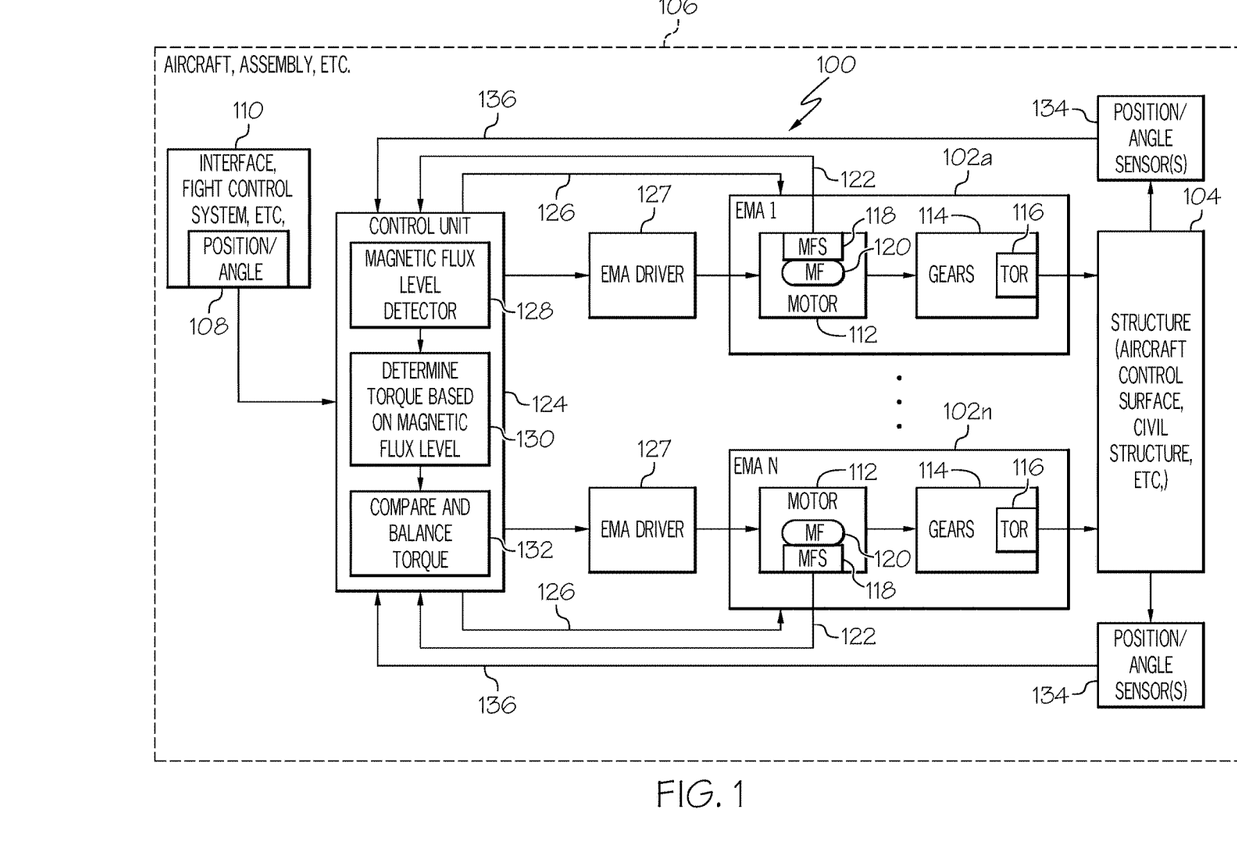
FIG. 1 is a block schematic diagram of an example of a multiple actuator control system in accordance with an embodiment of the present disclosure.

FIG. 1 is a block schematic diagram of an example of a system 100 for controlling multiple actuators 102a-102n or electromechanical actuators (EMAs) that are attached to a structure 104 for moving and positioning the structure 104 in accordance with an embodiment of the present disclosure. The structure 104 may be any type of structure or a component of a device or assembly 106 that requires multiple actuators 102a-102n to move and position the structure 104 relative to the device or assembly 106. In accordance with an embodiment, the structure 104 is a flight control surface of an aircraft. In another example, the structure 104 is a moveable component, such as a door, dome, appendage, etc. of a civil structure, such as a building, bridge or other civil structure and the multiple actuators 102a-102n move the movable component relative to the civil structure. The system 100 described herein may be configured to move any structure relative to another structure that calls for multiple actuators. The multiple separate actuators 102a-102n are anchored to the device or assembly 106 and attached to the structure 104 by any suitable arrangement. The multiple actuators 102a-102n move and position the structure 104 relative to the assembly 106 in response to an electrical signal, such as a position signal or angle signal 108 from an interface 110 or flight control system in the exemplary embodiment where the device or assembly 106 is an aircraft.

Each actuator 102a-102n includes an electric motor 112. In accordance with an embodiment, the electric motor 112 is a three-phase electric motor. The motor 112 of each actuator 102a-102n is mechanically coupled to a set of gears 114 or a gear assembly. The set of gears 114 of each actuator 102a-102n are mechanically coupled or attached to the structure 104 or aircraft control surface by any suitable arrangement. As described herein, the motor 112 during operation is controllable to provide a particular torque 116 or force that is mechanically transferred to the structure 104 by the set of gears 114 for moving the structure 104 at a predetermined speed and positioning the structure 104 at a predetermined position or angle relative to the assembly 106 or aircraft in response to the position or angle signal 108.

The system 100 includes a magnetic flux sensor 118 in the motor 112 of each actuator 102a-102n. The magnetic flux sensor 118 senses a magnetic flux 120 in an associated motor 112 in response to an electric current being applied to the associated motor 112 for operation of the motor 112. The magnetic flux generates an electrical voltage signal 122 that corresponds to or is proportional to a strength of the magnetic field created by the magnetic flux 120 in the associated motor 112. In accordance with an embodiment where the motor 112 is a three-phase electric motor, the magnetic flux sensor 118 includes a magnetic flux sensor 118a-118c (FIG. 2) for each phase. The magnetic flux sensor 118a-118c associated with each phase senses the magnetic flux in the associated phase. An example of a magnetic flux sensor 118 or magnetic flux sensor 118a-118c for each phase of a three-phase electric motor 112 will be described with reference to FIG. 2.

The system 100 also includes a control unit 124 that receives the electrical voltage signal 122 from the magnetic flux sensor 118 or magnetic flux sensors 118a-118c of each actuator 102a-102n. The control unit 124 is configured to generate a separate drive command signal 126 to each actuator 102a-102n, or to an electromechanical drive actuator (EMA) driver circuit 127 associated with each actuator 102a-102n, that balances the torque 116 applied to the structure 104 by each actuator 102a-102n in response to the magnetic flux 120 sensed in the motor 112 of each actuator 102a-102n.

In accordance with an embodiment, the control unit 124 includes a magnetic flux level detector 128 associated with each magnetic flux sensor 118. As described in more detail herein, a magnetic flux sensor 118 is associated with each phase of the three-phase electric motor 112 of each actuator 102a-102n. Each magnetic flux level detector 128 generates an electrical signal that corresponds to a magnetic flux level in an associated phase of the motor 112. The electrical signal corresponding to the magnetic flux level for each phase of a particular motor 112 is transmitted to a circuit 130 to determine a magnetic flux density or torque based on the magnet flux level in each phase of the particular motor 112. A circuit 130 to determine a magnetic flux density or torque is associated with each actuator 102a-102n. An example of the magnetic flux level detector 128 will be described with reference to FIG. 3 and an example of the circuit 130 to determine the magnetic flux density or torque provided by the motor 112 of each actuator 102a-102n will be described with reference to FIG. 4.

In accordance with an embodiment, the control unit 124 also includes a compare and balance torque module 132. The compare and balance torque module 132 receives an output signal from each circuit 130 representing the torque 116 provided by the motor 112 of each actuator 102a-102n to the structure 104. The compare and balance torque module 132 is configured to compare each output signal from the circuit 130 and to generate a command signal 126 to each actuator 102a-102n that balances the torque 116 applied by each actuator 102a-102n to the structure 104. Balancing the torque 116 applied by each of the actuators 102a-102n prevents force fighting or any resistance between the actuators 102a-102n so that the actuators 102a-102n act in unison in moving and positioning the structure 104. An example of the compare and balance torque module 132 will be described with reference to FIG. 5. Any device or circuit or combination of devices or circuits capable of comparing multiple signals and generating output signals to balance the torques applied by each actuator 102a-102n may be used for the compare and balance torque module 132.

In accordance with the exemplary embodiment in FIG. 1, the system 100 includes a position or angle sensor or sensors 134 to determine an actual position or angle of the structure 104 or flight control surface relative to the assembly 106 or aircraft. The position or angle sensor or sensors 134 transmit an actual position signal 136 corresponding to the actual position or angle of the structure 104 to the control unit 124. The control unit 124 compares the actual position or angle of the structure 104 with the position signal or angle signal 108 from the interface 110 or flight control system to verify that the structure 104 is correctly positioned or angled.

Figure 2:
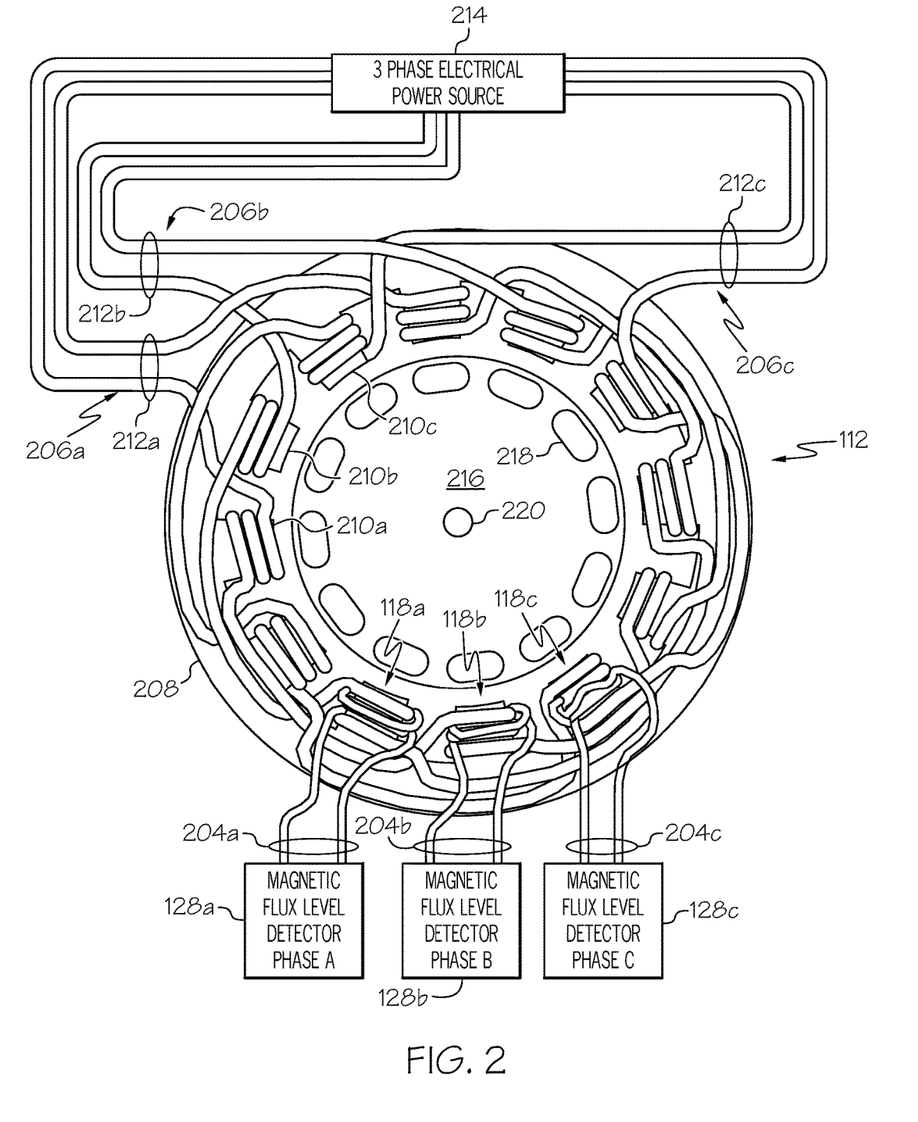
FIG. 2 is an example of an electric motor for an actuator including magnetic flux sensors in accordance with another embodiment of the present disclosure.

Referring also to FIG. 2, FIG. 2 is an example of a three-phase electric motor 112 for an actuator including magnetic flux sensors 118a, 118b and 118c in accordance with an embodiment of the present disclosure. As previously described, in accordance with an embodiment, the motor 112 of each actuator 102a-102n in FIG. 1 is a three-phase electric motor 112 and the magnetic flux sensors 118a, 118b and 118c include a respective flux sensor winding 204a, 204b and 204c for each phase 206a, 206b and 206c of the three-phase electric motor 112.

The three-phase electric motor 112 includes an annular stator 208. The annular stator 208 includes a plurality of stator posts 210a, 210b and 210c. Each phase 206a, 206b, 206c includes an associated plurality of stator posts 210a, 210b and 210c. The stator posts 210a, 210b and 210c for each phase 206a, 206b and 206c are individually interspersed consecutively about the annular stator 208.

The annular stator 208 also includes a phase winding 212a, 212b and 212c for each phase 206a, 206b and 206c. The phase winding 212a, 212b and 212c for each phase is wound around the plurality of stator posts 210a, 210b and 210c associated with each respective phase 206a, 206b and 206c. The phase winding 212a, 212b and 212c is wound one or more times around each stator post 210a, 210b and 210c. Each of the phase windings 212a, 212b and 212c are electrically connected to a respective phase of a three-phase electrical power supply 214.

The flux sensor winding 204a, 204b, 204c for each phase 206a, 206b and 206c is a secondary winding wound around at least one stator post 210a, 210b and 210c of an associated phase 206a, 206b or 206c. In accordance with the embodiment shown in FIG. 2, the flux sensor winding 204a, 204b and 204c is wound around a single stator post 210a, 210b and 210c for each phase 206a, 206b and 206c. The flux sensor winding 204a, 204b and 204c for each phase 206a, 206b and 206c is wound one or more time around the respective stator post 210a, 210b and 210c for each phase 206a, 206b and 206c. An electrical current flowing in the phase winding 212a, 212b or 212c of a particular phase 206a, 206b or 206c generates a magnetic flux in each stator post 210a, 210b and 210c of the particular phase 206a, 206b or 206c and the magnetic flux produces a magnetic field at each stator post 210a, 210b or 210c of the particular phase that is energized by the electrical current. The magnetic field generates a voltage signal across the flux sensor winding 204a, 204b or 204c for the particular phase. The voltage signal has an amplitude that corresponds to or is proportional to a strength of the magnetic field which is corresponds to a level of the magnetic flux in the stator post 210a, 210b or 210c around which the flux sensor winding 204a, 204b or 204c for the particular phase is wound.

The flux sensor winding 204a, 204b and 204c for each phase 206a, 206b and 206c is electrically connected to a magnetic flux level detector 128a, 128b and 128c for each phase. Accordingly, each actuator 102a-102n (FIG. 1) is associated with a magnetic flux level detector 128a, 128b and 128c for each phase of the three-phase electric motor 112. The flux sensor winding 204a, 204b and 204c samples the magnetic flux level developed in each phase 206a, 206b and 206c of the three-phase electric motor 112 as an electrical current is respectively applied to each phase by the three-phase electrical power supply 214 for operation of the motor 112. In accordance with an embodiment and as previously described, the magnetic flux level detectors 128a, 128b and 128c for each phase for each actuator 102a-102n are components of the control unit 124. In another embodiment, the magnetic flux level detectors 128a, 128b and 128c for each actuator 102a-102n are separate from the control unit 124 or located in a different component of the system 100.

The three-phase electric motor 112 also includes a rotor 216 disposed within the annular stator 208. In accordance with the exemplary embodiment shown in FIG. 2, the rotor 216 has a circular or disk shape. The rotor 216 includes a plurality of magnets 218 or permanent magnets placed circumferentially about the rotor 216 proximate an outer edge of the rotor 216. The magnets 218 are spaced to coincide with the stator posts 210a, 210b, 210c. Accordingly, as each phase winding 212a, 212b, and 212c is sequentially energized by the three-phase electrical power source 214, the magnets 218 are attracted by the magnetic field generated at each stator post 210 as each respective phase 206a, 206b and 206c is energized causing the rotor 216 to rotate within the annular stator 208. A hub or drive axel 220 is mechanically linked to the set of gears 114 (FIG. 1) to apply the torque 116 from the motor 112 to the structure 104 for moving and position the structure 104 similar to that previously described.

Figure 3:
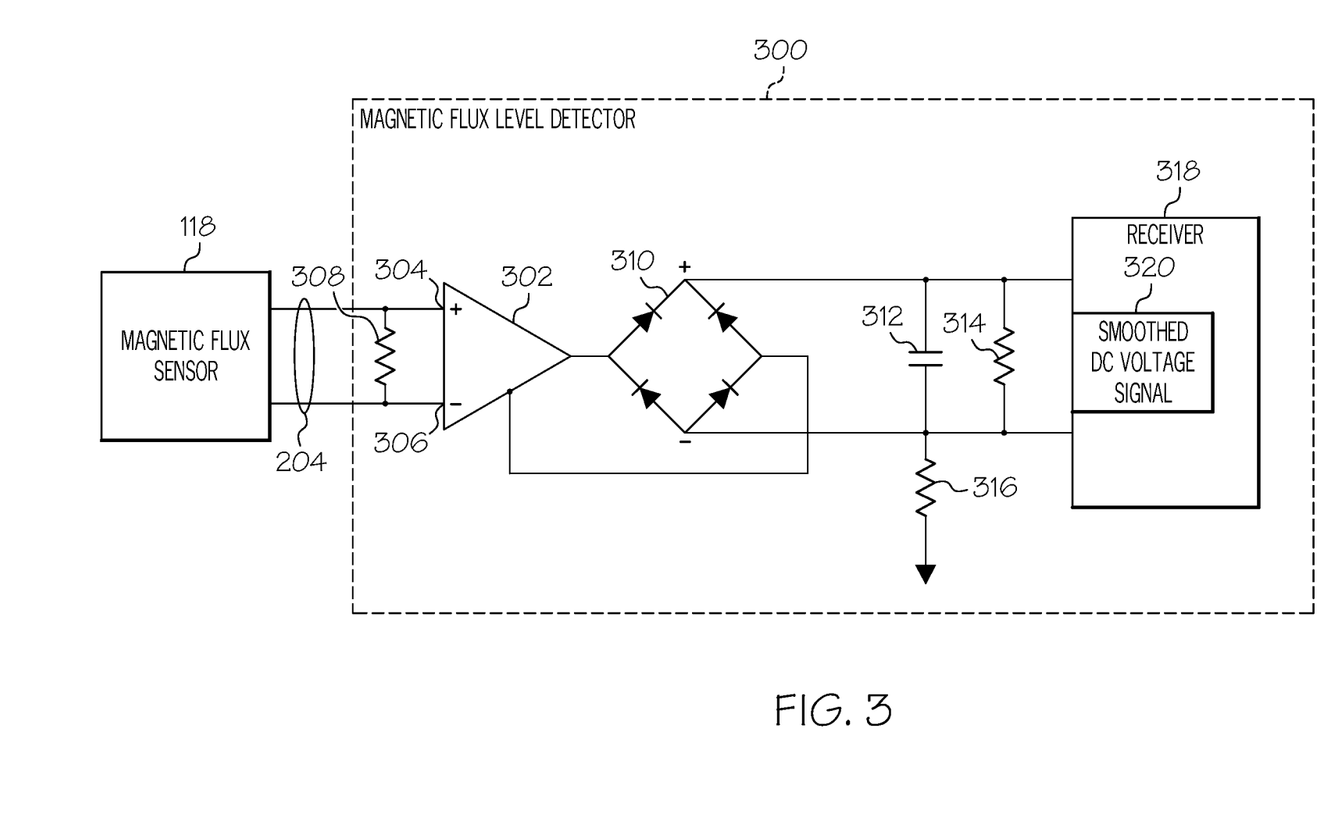
FIG. 3 is a schematic diagram of an example of a magnetic flux level detector in accordance with an embodiment of the present disclosure.

Referring to FIG. 3, FIG. 3 is a schematic diagram of an example of a magnetic flux level detector 300 in accordance with an embodiment of the present disclosure. In accordance with an embodiment, the magnetic flux level detector 300 is used for each magnetic flux level detector 128a-128c in FIGS. 1 and 2. The magnetic flux level detector 300 is configured to convert an alternating current (AC) voltage signal from an associated magnetic flux sensor 118a, 118b or 118c, or flux sensor winding 204a, 204b or 204c to a direct current (DC) voltage signal that corresponds to a magnetic flux level in an associated phase of the motor 112. The exemplary magnetic flux level detector 300 includes an amplifier 302 with a positive input terminal 304 connected to one end of the flux sensor winding 204 and a negative input terminal 306 electrically connected to another end of the flux sensor winding 204. The ends of the flux sensor winding 204 is shorted by a shorting resistor 308 at the input to the amplifier 302 to provide an input voltage to the amplifier 302. An value of the shorting resistor 308 is selected to provide a desired input voltage to the amplifier 302 and based on a level of the magnetic flux 120 sensed by the magnetic flux sensor 118.

A bridge rectifier 310 receives an output signal from the amplifier 302 to convert the AC voltage signal to a DC voltage signal. A smoothing capacitor 312 smooths or removes any ripples or noise in the DC output voltage signal from the bridge rectifier 310. A bleeder resistor 314 is connected to ground potential through a grounding resistor 316 to discharge the smoothing capacitor 312. A receiver 318 receives a smoothed DC voltage signal 320 or output DC voltage signal. The smoothed DC voltage signal 320 corresponds to the magnetic flux level in the particular phase of the motor 112 associated with the magnetic flux sensor 118. In accordance with another embodiment, the bridge rectifier 310 is replaced by a circuit or device to determine a rate of change of the magnetic flux 120 detected by the magnetic flux sensor 118. The rate of change of the magnetic flux 120 is converted to the DC voltage signal 320 that corresponds to the rate of change of the magnetic flux 120 which is used to control the torque applied 116 applied by each actuator 102a-102n to the structure 104 as described herein.

Figure 4:
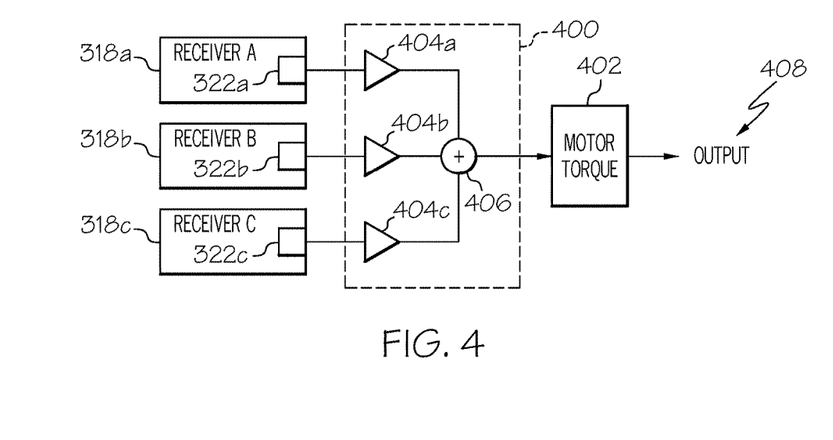
FIG. 4 is a schematic diagram of an example of a circuit for determining motor torque from the detected magnetic flux level in accordance with an embodiment of the present disclosure.

Referring to FIG. 4, FIG. 4 is a schematic diagram of an example of a circuit 400 for determining motor torque 402 from the detected magnetic flux level in accordance with an embodiment of the present disclosure. In accordance with an embodiment, the circuit 400 is a component of the control unit 124 in FIG. 1. In another embodiment, the circuit 400 is a separate component from the control unit 124. The circuit 400 is configured to determine a magnetic flux density for an associated motor 112 from the DC voltage signals 320 from each of the three phases of the associated motor 112. The circuit 400 includes an amplifier 404a-404c for receiving an output DC voltage signal 322a-322c from a receiver 318a-318c of a magnetic flux level detector 128a-128c (FIG. 2) or 300 (FIG. 3) associated with each phase 206a-206c of the associated motor 112. Each output DC voltage signals 322a-322c correspond to a smoothed DC voltage signals 320 for one of the three phases of the motor 112. The DC voltage signals 322a-322c amplified by the respective amplifiers 404a-404c are summed by a summing device 406. The sum of the DC voltage signals 322a-322c associated with each phase 206a-206c of the associated motor 112 provides the magnetic flux density for the associated motor 112. The magnetic flux density for the associated motor 112 corresponds to a torque 402 provided by the associated motor 112 when the motor 112 is energized. The circuit 400 generates an output signal 408 that represents the torque 402 provided by the motor 112 to the structure 104.

Figure 5:
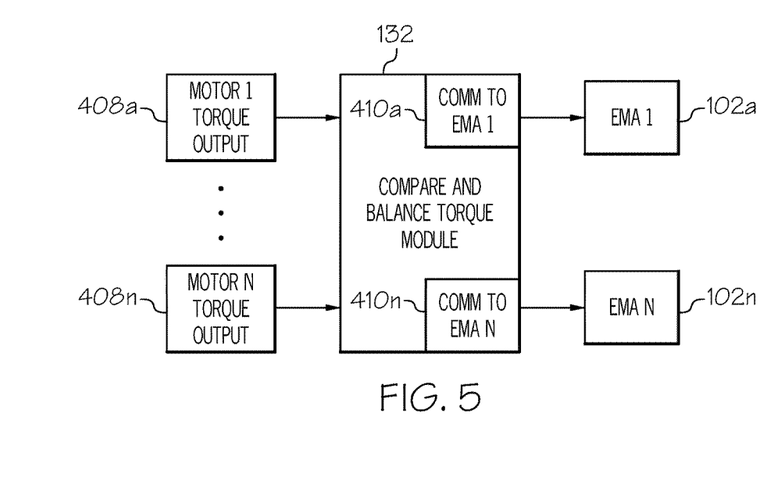
FIG. 5 is a block schematic diagram of an example of a compare and balance torque module that balances a torque or force applied to the structure by each actuator in accordance with an embodiment of the present disclosure.

Referring to FIG. 5, FIG. 5 is a block schematic diagram of an example of a compare and balance torque module 132 that balances a torque or force applied to the structure 104 by each actuator 102a-102n in accordance with an embodiment of the present disclosure. In accordance with an embodiment, the compare and balance torque module 132 is used for the compare and balance torque module 132 in FIG. 1 and is a component of the control unit 124. In another embodiment, the compare and balance torque module 132 is a separate component from the control unit 124. The compare and balance torque module 132 receives a plurality of output signals 408a-408n. Each output signal 408a-408n represents the torque 402 provided by the motor 112 of each actuator 102a-102n to the structure 104. The compare and balance torque module 132 is configured to monitor and compare each output signal 408a-408n. Any differences between the output signals 408a-408n corresponds to differences in the torque 402 applied by the respective motors 112 or torque 116 applied by the associated actuators 102a-102n to the structure 104. The motor torque 402 provided by the motor 112 is transferred by the set of gears 114 and applied by the set of gears 114 as a corresponding torque 116 to the structure 104. The differences between the output signals 408a-408n are nulled or equalized by the compare and balance torque module 132 to generate a drive command signal 410a-420n to each actuator 102a-102n that balances the torque 116 or force applied by each actuator 102a-102n to the structure 104 (FIG. 1).

Figure 6:
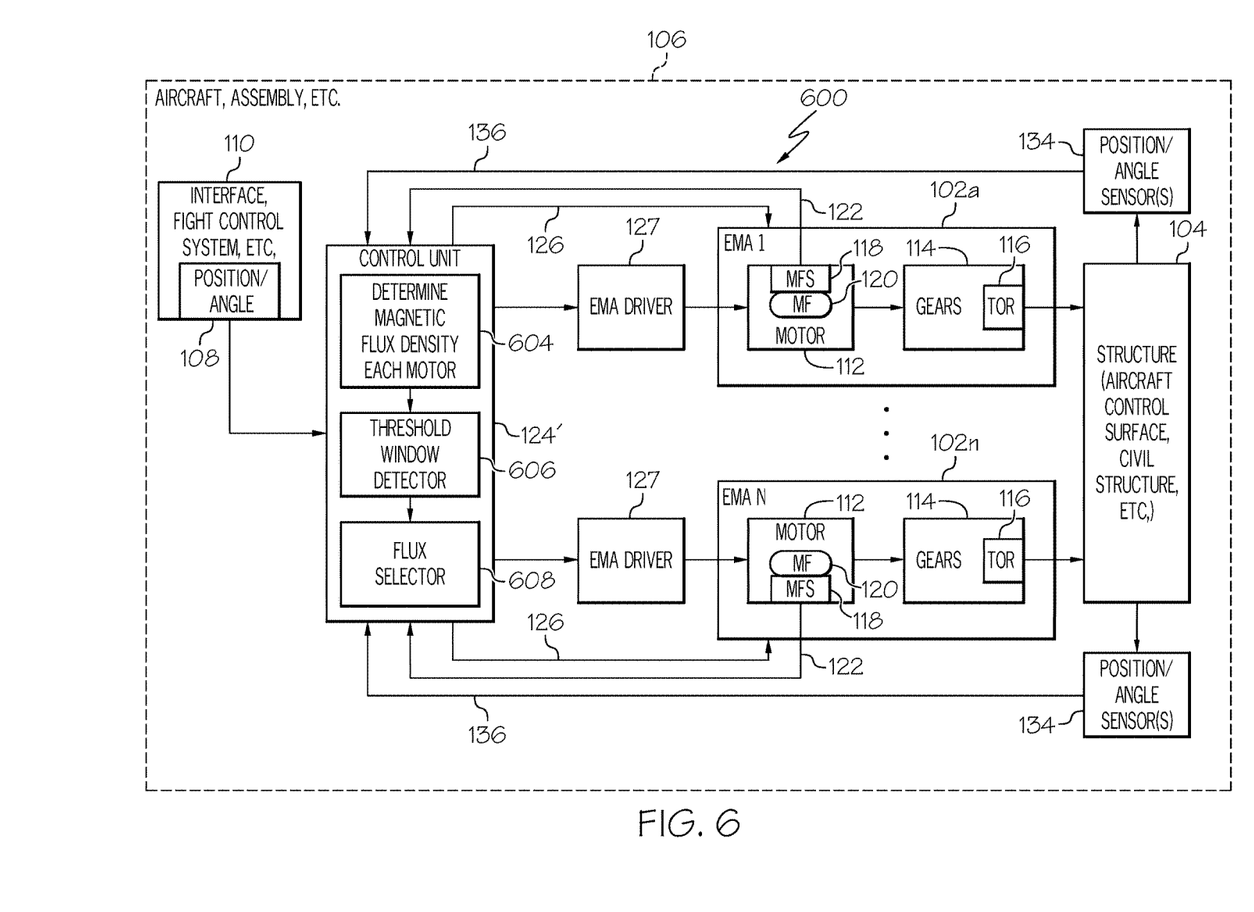
FIG. 6 is a block schematic diagram of an example of a multiple actuator control system in accordance with another embodiment of the present disclosure.

FIG. 6 is a block schematic diagram of an example of a multiple actuator control system 600 in accordance with another embodiment of the present disclosure. The multiple actuator control system 600 is similar to the actuator control system 100 in FIG. 1 except control system 600 includes a different or modified control unit 124'. The control unit 124' includes a module 604 for determining a magnetic flux density for each motor 112. In accordance with the exemplary embodiment shown in FIG. 6, the module 604 for determining the magnetic flux density of each motor 112 includes a magnetic flux level detector 128 or 300 associated with each phase of each motor 112 and a circuit 130 or 400 associated with each motor 112 for determining the magnetic flux density of each motor 112.

The control unit 124' also includes a threshold window detector 606 and a flux selector 608. The threshold window detector 606 is configured to perform a function including detecting whether the magnetic flux density of a particular actuator 102a-102n is within preset performance limits. The flux selector 608 is configured to perform a function including deactivating the particular actuator 102a-102n in response to the magnetic flux density of the particular actuator 102a-102n being greater than an upper preset limit or lower than a lower preset limit. In accordance with an embodiment, the flux selector 608 is further configured to perform a function including neutralizing a difference between the magnetic flux density of the motor 112 of each actuator 102a-102n. Neutralizing the difference between the magnetic flux density of the motor 112 of each actuator 102a-102n includes equalizing the magnetic flux density of the motor 112 of each actuator 102a-102n by modifying a gain of an actuator (EMA) driver circuit 127 associated with each actuator 102a-102n. In accordance with an embodiment, the flux selector 608 or the control unit 124' sends a command signal to each EMA driver circuit 127 that causes the gain or amplitude of a drive voltage energizing each motor 112 to provide an equivalent torque 116 to the structure 104 by each actuator 102a-102n.

Figure 7:
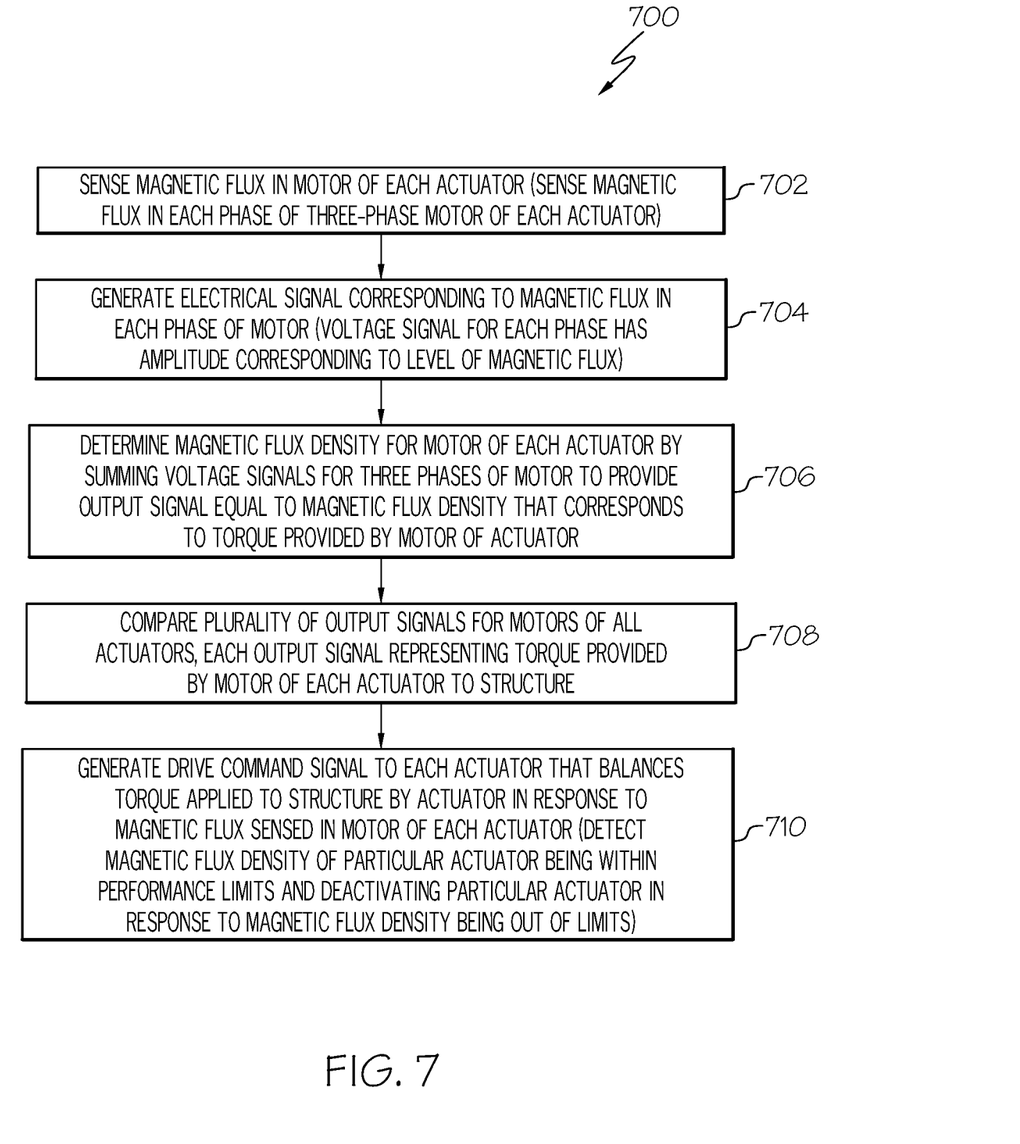
FIG. 7 is a flow chart of an example of a method for controlling multiple actuators in accordance with an embodiment of the present disclosure.

FIG. 7 is a flow chart of an example of a method 700 for controlling multiple actuators in accordance with an embodiment of the present disclosure. In accordance with an embodiment, the method 700 is embodied in and performed by the system 100 in FIG. 1 or system 600 in FIG. 6. The multiple actuators are similar to the actuators 102a-102n in FIG. 1 and are attached to a structure 104 for moving and positioning the structure 104 similar to that previously described. In block 702, a magnetic flux in a motor of each actuator is sensed. In accordance with an embodiment, the motor is a three-phase electric motor and the magnetic flux is sensed in each phase of the three-phase electric motor of each actuator. In block 704, an electrical signal is generated that corresponds to the magnetic flux in each phase of the motor. A voltage signal is generated for each phase that has a amplitude corresponding to a level of the magnetic flux in the associated phase of the motor.

In block 706, a magnetic flux density is determined for the motor associated with each actuator by summing the voltage signals for each of the three phases of the motor to provide an output signal that equals the magnetic flux density of the associated motor. The magnetic flux density for the motor corresponds to a torque provided by the motor. A plurality of output signals for each actuator are generated that each represent the magnetic flux density of an associated motor of each actuator and each magnetic flux density corresponds to the torque provided by the associated motor.

In block 708, the plurality of output signals are compared. In block 710, a drive command signal to each actuator is generated that balances a torque applied to the structure by each actuator in response to the magnetic flux sensed in the motor of each actuator. Similar to that previously described, any differences between the output signals are nulled or equalized in generating the drive command signal to each actuator motor so that the torque applied to the structure by each actuator is balanced.

In accordance with another embodiment, the magnetic flux density of a particular actuator is detected if outside preset performance limits. The magnetic flux density of the motor of each actuator is determined and compared to an upper preset limit and a lower preset limit. A particular actuator is deactivated in response to the magnetic flux density of the particular actuator being greater than an upper preset limit or lower than a lower preset limit.

In accordance with a further embodiment, a difference between the magnetic flux density of the motor of each actuator is neutralized or equalized. A command signal is generated and sent to each actuator in response to neutralizing or equalizing the magnetic flux density of the motor of each actuator to balance the torque applied to the structure by each actuator.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the invention to the specific embodiments described herein.

What is claimed is:

1. A system for controlling multiple actuators that are attached to a structure for moving and positioning the structure, the system comprising:
   a magnetic flux sensor in a motor of each actuator, the magnetic flux sensor comprising a flux sensor winding in each motor for sensing a magnetic flux in an associated motor and generating an electrical signal that corresponds to the magnetic flux in the associated motor; and
   a control unit that receives the electrical signal from the magnetic flux sensor in each motor of each actuator of the multiple actuators, the control unit comprising:
   a circuit associated with each actuator that generates an output signal of a plurality of output signals, each output signal representing a torque provided by the motor of a respective actuator to the structure based on a magnetic flux level in the motor of the respective actuator; and
   a compare and balance torque module configured to compare the output signals representing the torque provided by the motor of each actuator and to generate a drive command signal to each actuator that balances the torque applied to the structure by each actuator in response to the magnetic flux sensed in the motor of each actuator.

2. The system of claim 1, wherein the motor of each actuator comprises a three-phase electric motor and the magnetic flux sensor comprises a separate flux sensor winding for each phase of the three-phase electric motor.

3. The system of claim 1, wherein the structure is a flight control surface of an aircraft.

4. The system of claim 2, wherein the three-phase electric motor comprises an annular stator, the annular stator comprising:
   a plurality of stator posts for each phase, the stator posts for each phase being individually interspersed consecutively about the annular stator; and a phase winding for each phase, the phase winding for each phase being wound around the plurality of stator posts associated with each respective phase.

5. The system of claim 2, wherein the flux sensor winding for each phase is electrically connected to a magnetic flux level detector for each phase, wherein each magnetic flux level detector is configured to convert an alternating current (AC) voltage signal from an associated flux sensor winding to a direct current (DC) voltage signal that corresponds to the magnetic flux level in an associated phase of the motor.

6. The system of claim 4, wherein the flux sensor winding for each phase comprises a secondary winding wound around at least one stator post of an associated phase, an electrical current flowing in the phase winding of a particular phase generates a magnetic flux in each stator post of the particular phase and the magnetic flux produces a magnetic field at each stator post, the magnetic field generates a voltage signal across the flux sensor winding for the particular phase, wherein the voltage signal has an amplitude corresponding to a level of the magnetic flux in the stator post around which the flux sensor winding for the particular phase is wound.

7. The system of claim 5, wherein the circuit associated with each actuator is configured to determine a magnetic flux density for the motor from the DC voltage signals from the three phases of the motor, wherein the magnetic flux density for the motor corresponds to the torque provided by the motor when the motor is energized and wherein the circuit generates the output signal that represents the torque provided by the motor to the structure.

8. The system of claim 7, wherein the DC voltage signals from the three phases of the motor are summed to provide the magnetic flux density for the motor and the output signal.

9. The system of claim 7, wherein the compare and balance module receives the plurality of output signals, each output signal representing the torque provided by the motor of each actuator to the structure, wherein the compare and balance module is configured to compare each output signal and to generate the drive command signal to each actuator that balances the torque applied by each actuator to the structure.

10. The system of claim 7, wherein the control unit comprises:
a threshold window detector configured to perform a function comprising detecting the magnetic flux density of a particular actuator being outside preset performance limits; and
a flux selector configured to perform a function comprising deactivating the particular actuator in response to the magnetic flux density of the particular actuator being greater than an upper preset limit or lower than a lower preset limit.

11. The system of claim 10, wherein the flux selector is further configured to perform a function comprising neutralizing a difference between the magnetic flux density of the motor of each actuator.

12. The system of claim 11, wherein neutralizing the difference between the magnetic flux density of the motor of each actuator comprises equalizing the magnetic flux density of the motor of each actuator by modifying a gain of an actuator driver circuit associated with each actuator.

13. A system for controlling multiple actuators that are attached to a structure for moving and positioning the structure, the system comprising:
a magnetic flux sensor in a motor of each actuator, the magnetic flux sensor sensing a magnetic flux in an associated motor and generating an electrical signal that corresponds to the magnetic flux in the associated motor; and
a control unit that receives the electrical signal from the magnetic flux sensor of each actuator, the control unit comprising:
a threshold window detector configured to perform a function comprising detecting a magnetic flux density of a particular actuator being outside preset performance limits based on the electrical signal corresponding to the magnetic flux in the associated motor of the particular actuator; and
a flux selector configured to perform a function comprising deactivating the particular actuator in response to the magnetic flux density of the particular actuator being greater than an upper preset limit or lower than a lower preset limit.

14. The system of claim 13, wherein the flux selector is further configured to perform a function comprising neutralizing a difference between the magnetic flux density of the motor of each actuator.

15. A method for controlling multiple actuators that are attached to a structure for moving and positioning the structure, the method comprising:
sensing a magnetic flux using a flux sensor winding in a motor of each actuator, the flux sensor winding in each motor generating an electrical signal that corresponds to the magnetic flux in an associated motor;
generating a plurality of signals, by a control unit, each signal representing a torque provided by the motor of each actuator to the structure based on a magnetic flux level in the motor of each actuator;
comparing the signals by the control unit; and
generating, by the control unit, a drive command signal to the motor of each actuator of the multiple actuators that balances the torque applied to the structure by each actuator in response to the magnetic flux sensed in the motor of each actuator.

16. The method of claim 15, wherein the motor of each actuator comprises a three-phase electric motor and wherein sensing the magnetic flux in the motor comprises sensing the magnetic flux in each phase.

17. The method of claim 16, further comprising generating a voltage signal for each phase that has an amplitude corresponding to a level of the magnetic flux in each phase of the motor.

18. The method of claim 17, further comprising determining a magnetic flux density for the motor associated with each actuator by summing the voltage signals for the three phases of the motor to provide an output signal that equals the magnetic flux density, wherein the magnetic flux density for the motor corresponds to the torque provided by the motor.

19. The method of claim 18, further comprising:
detecting the magnetic flux density of a particular actuator being outside preset performance limits; and
deactivating the particular actuator in response to the magnetic flux density of the particular actuator being greater than an upper preset limit or lower than a lower preset limit.

20. The method of claim 19, further comprising neutralizing a difference between the magnetic flux density of the motor of each actuator.

21. A system for controlling multiple actuators that are attached to a structure for moving and positioning the structure, the system comprising:

a magnetic flux sensor in a motor of each actuator, the magnetic flux sensor sensing a magnetic flux in an associated motor and generating an electrical signal that corresponds to the magnetic flux in the associated motor; and
a control unit that receives the electrical signal from the magnetic flux sensor of each actuator, the control unit comprising:
  a threshold window detector configured to perform a function comprising detecting a magnetic flux density of a particular actuator being outside preset performance limits based on the electrical signal corresponding to the magnetic flux in the associated motor of the particular actuator; and
  a flux selector configured to perform a function comprising deactivating the particular actuator in response to the magnetic flux density of the particular actuator being greater than an upper preset limit or lower than a lower preset limit, wherein the flux selector is further configured to perform a function comprising neutralizing a difference between the magnetic flux density of the motor of each actuator.

\* \* \* \* \*